(12) United States Patent
Zhou

(10) Patent No.: US 10,896,003 B2
(45) Date of Patent: Jan. 19, 2021

(54) DATA STORAGE DEVICE AND SYSTEM WITH INTERRUPTION OPTIMIZATION

(71) Applicant: Shannon Systems Ltd., Shanghai (CN)

(72) Inventor: Zhen Zhou, Shanghai (CN)

(73) Assignee: SHANNON SYSTEMS LTD., Shanghai (CN)

( * ) Notice: Subject to any disclaimer, the term of this patent is extended or adjusted under 35 U.S.C. 154(b) by 0 days.

(21) Appl. No.: 16/415,015

(22) Filed: May 17, 2019

(65) Prior Publication Data

US 2020/0326883 A1   Oct. 15, 2020

(30) Foreign Application Priority Data

Apr. 9, 2019 (CN) .......................... 2019 1 0281142

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 3/0604; G06F 3/0679
See application file for complete search history.

(56) References Cited

U.S. PATENT DOCUMENTS

2015/0193360 A1\*  7/2015  Lu .......................... G06F 13/24
                                                                710/48
2017/0336988 A1\*  11/2017 Kim ...................... G06F 3/0685

\* cited by examiner

*Primary Examiner* — Edward J Dudek, Jr.
(74) *Attorney, Agent, or Firm* — McClure, Qualey & Rodack, LLP

(57) ABSTRACT

A data storage device with interruption optimization having a non-volatile memory and a controller is shown. The controller operates the non-volatile memory in response to a host. The controller has a buffer which is filled with an interrupt delay that is evaluated by the host according to the status of the central processing unit of the host. The controller delays sending an interrupt request to the host according to the interrupt delay.

12 Claims, 4 Drawing Sheets

DATA STORAGE DEVICE AND SYSTEM WITH INTERRUPTION OPTIMIZATION

CROSS REFERENCE TO RELATED APPLICATIONS

This Application claims priority of China Patent Application No. 201910281142.2, filed on Apr. 9, 2019, the entirety of which is incorporated by reference herein.

BACKGROUND OF THE INVENTION

Field of the Invention

The invention relates to the interrupt transmission from a device end to a host end in a data storage system.

Description of the Related Art

A device typically links to a host and operates according to the requests issued by the host. Using a data storage device as an example, the host may request to read data from the device. When the device has prepared the data, the device contacts the host to retrieve the data. The ready of data at the device end may be regarded as an event. When the event happens, the device typically sends an interrupt (IRQ) to a central processing unit (CPU) of the host and thereby the CPU acts accordingly. Upon receipt of an interrupt request IRQ from the device end, the CPU enters an overhead period. During the overhead period, the CPU may store the parameters of the interrupted task. When the overhead period is over, the CPU enters a working period to deal with the event proposed by the device (for example, reading out the data ready at the device end). When the process invoked by the event finishes, the CPU may resume the interrupted task.

However, frequently issued interrupt requests IRQs may cause the CPU of the host to redundantly repeat the overhead period. In particular, when the overhead period is much longer than the working period, the CPU is quite inefficient.

Polling is another solution for the communication between a host and a device. The CPU of the host normally asks the device if an event has happened. However, there is not always have events happened at the device end waiting to be processed by the CPU, and so the polling requested by the CPU of the host is not efficient.

How to effectively deal with events that have happened at the device end is an important topic in this technical field.

BRIEF SUMMARY OF THE INVENTION

For a data storage system, the present invention proposes a high-performance peripheral device service which dynamically adjusts the timing that the device outputs an interrupt request to the host.

A data storage device in accordance with an exemplary embodiment of the disclosure has a non-volatile memory and a controller. The controller operates the non-volatile memory in response to a host. The controller has a buffer. The buffered is for storage of the value of an interrupt delay. The interrupt delay is evaluated by the host according to the status of the central processing unit of the host. According to the interrupt delay stored in the buffer, the controller delays sending an interrupt request to the host.

In an exemplary embodiment, when the controller sends a first interrupt request to the host, the driver of the host checks whether the central processing unit has awakened from an idle loop or has been interrupted from performing a task. Accordingly, the driver adjusts the interrupt delay to delay a second interrupt request.

In an exemplary embodiment, after the central processing unit completes an overhead period and a working period corresponding to the first interrupt request, the controller is not permitted to issue the second interrupt request until the interrupt delay is satisfied.

When the central processing unit wakes from an idle loop, the interrupt delay is shortened by a first adjustment amount. When the central processing unit is interrupted from performing a task, the interrupt delay is increased by a second adjustment amount.

In an exemplary embodiment, the first adjustment amount is greater than the second adjustment amount.

In an exemplary embodiment, the interrupt delay has an upper limit.

In an exemplary embodiment, when the overhead period is completed, the driver prompts the controller to mark events queued in a queue. The central processing unit completes the marked events during the working period. When the interrupt delay has been satisfied and there are any unmarked events in the queue, the controller sends the second interrupt request.

In an exemplary embodiment, when the working period is completed, the driver provides the interrupt delay to be filled into the buffer of the controller, and the controller determines a transmission time point of the second interrupt request according to the interrupt delay.

A data storage system implemented in accordance with an exemplary embodiment of the disclosure includes a host in addition to a data storage device. The data storage device has a non-volatile memory and a controller. The controller operates the non-volatile memory in response to the host. The host has a central processing unit and runs a driver. According to a status of the central processing unit, the driver issues an interrupt delay to the data storage device. The controller delays sending an interrupt request to the host according to the interrupt delay.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description shows embodiments of carrying out the invention. This description is made for the purpose of illustrating the general principles of the invention and should not be taken in a limiting sense. The scope of the invention is best determined by reference to the appended claims.

The present invention specifically proposes a high-performance peripheral device service to be used in a data storage system. In the data storage system, a host operates a data storage device. In the data storage device, the non-volatile memory for long-term data retention may be a flash memory, a magnetoresistive RAM, a ferroelectric RAM, a resistive RAM, a spin transfer torque-RAM (STT-RAM) and so on. The following discussion uses flash memory as an example.

Today's data storage devices often use flash memory as the storage medium for storing user data from the host. There are many types of data storage devices, including memory cards, USB flash devices, SSDs, and so on. In another exemplary embodiment, a flash memory may be packaged with a controller to form a multiple-chip package called eMMC.

A data storage device using a flash memory as a storage medium can be applied in a variety of electronic devices, including a smartphone, a wearable device, a tablet computer, a virtual reality device, etc. A calculation module of an electronic device may be regarded as a host that operates a data storage device equipped on the electronic device to access a flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

The host and the data storage device may be connected through a high-speed communication interface, such as PCIe, any physical link, or a network. The communication between the data storage device and the host needs to be specially designed for a high-performance host and a high-performance data storage device.

Figure 1:
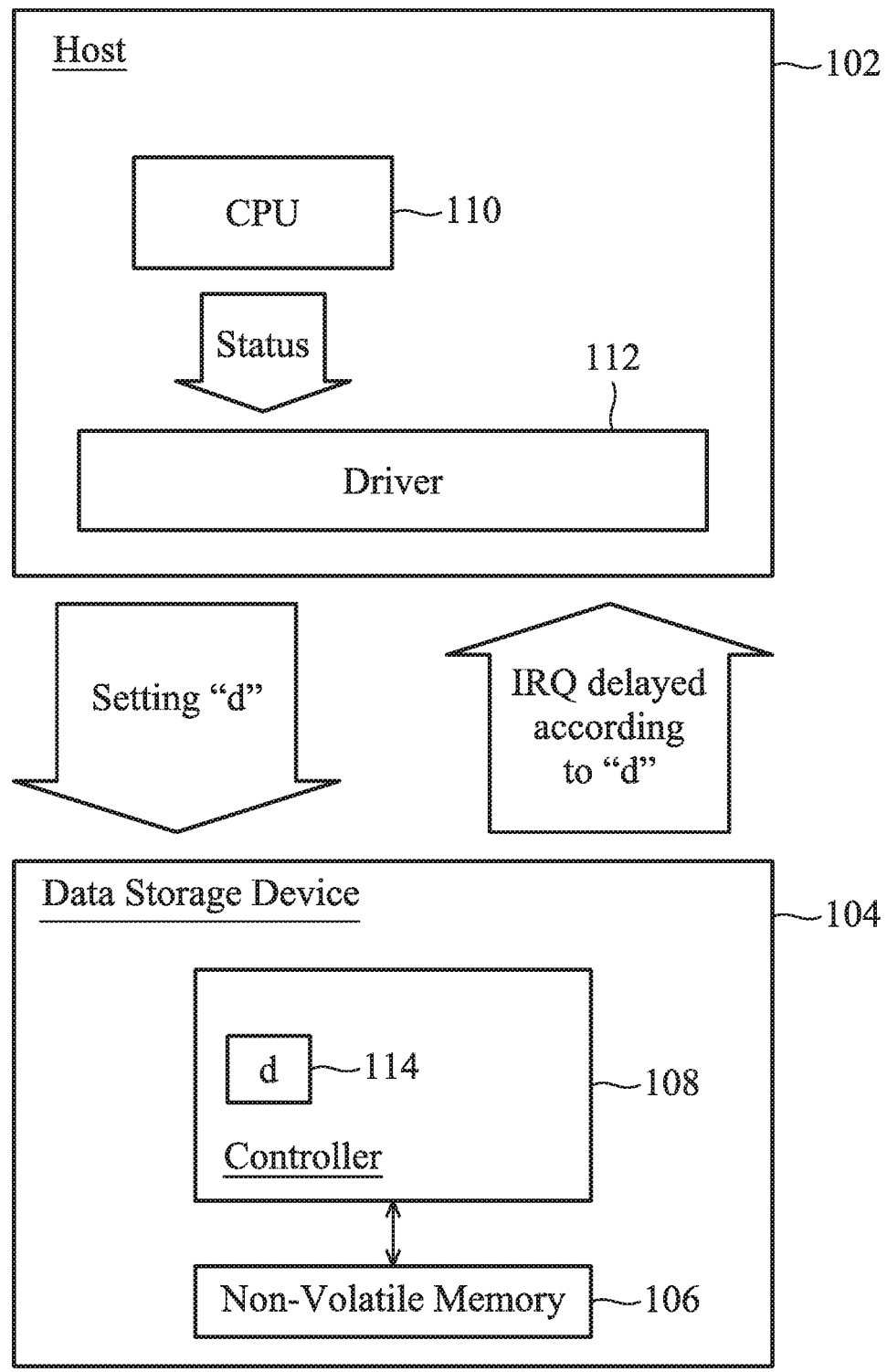
FIG. 1 illustrates a data storage system 100 in accordance with an embodiment of the present invention, which includes a host 102 and a data storage device 104.

FIG. 1 illustrates a data storage system 100 in accordance with an embodiment of the present invention, which includes a host 102 and a data storage device 104. The data storage device 104 has a non-volatile memory 106 and a controller 108. The host 102 has a central processing unit (CPU) 110 and runs a driver 112 for the data storage device 104. The host 102 operates the non-volatile memory 106 through the controller 108. The controller 108 may be divided into two parts, one part is responsible for controlling the non-volatile memory 106 and another part is for communication with the host 102. In one exemplary embodiment, the controller 108 includes a non-volatile memory control module/chip and a non-volatile memory express (NVMe) interface module/chip. The NVMe interface defines an interrupt mechanism, and transmits an interrupt request IRQ to the host 102 in a packet. The CPU 110 receives the interrupt request IRQ and acts in response to the event happened on the data storage device 104.

In particular, the present invention uses the buffer 114 of the controller 108 to store a value "d", which is for an interrupt delay. The controller 108 delays an interrupt request IRQ to the CPU 110 in accordance with the interrupt delay "d". As a result, the frequency at which the data storage device 104 issues interrupt requests IRQs to the host 102 is reduced, and the central processing unit 110 of the host 102 does not have to frequently respond to interrupt requests IRQs issued by the data storage device 104. The value of the interrupt delay "d" may be set by the driver 112 provided by the host 102. The driver 112 preferably adjusts the interrupt delay "d" according to the status of the central processing unit 110 (e.g., idle or not, CPU usage).

In one exemplary embodiment, when receiving the interrupt request IRQ, the driver 112 checks whether the central processing unit 110 is in an idle loop, or whether the CPU usage is lower than a threshold, for example, 50%. If so, the driver 112 shortens the interrupt delay "d" (for example, by subtracting an amount of time Delta1). In this way, the data storage device 104 can issue the next interrupt request IRQ earlier, making good use of the central processing unit 110 while it is in the idle loop.

When the driver 112 receives an interrupt request IRQ and determines that the central processing unit 110 is performing other tasks or the CPU usage exceeds a threshold, the driver 112 prolongs the interrupt delay "d" (for example, plus an amount of time Delta2). As such, the data storage device 104 delays the next interrupt request IRQ. The interrupt delay "d" may have an upper limit to avoid infinite prolonging, and the lower limit may be zero.

In one exemplary embodiment, the amount of time Delta1 is much greater than the amount of time Delta2. For example, Delta1 is 100 time units and Delta2 is 5 time units. In this way, once the central processing unit 110 is found in the idle loop, the interrupt delay "d" is greatly shortened, and the event of the data storage device 104 is processed in time by the central processing unit 110. The slowly-incremented interrupt delay "d" is for progressively facing the fact that the central processing unit 110 is busy, which avoids to overly occupy the resources of the central processing unit 110. By designing the amount of time Delta1 greater than the amount of time Delta2, the interrupt delay "d" quickly reaches a stable value suitable for the current status of the central processing unit 110.

In particular, after receiving the interrupt request IRQ, the central processing unit 110 waits for an overhead period before entering a working period. During the working period, the central processing unit 110 may process one or more events corresponding to the interrupt request IRQ. In an exemplary embodiment, when the central processing unit 110 finishes the overhead period, the driver 112 may prompt the data storage device 104 to mark events. The central processing unit 110 processes all marked events during the working period. As for the unmarked events, the central processing unit 110 does not necessarily process them in this round of interruption processing. In another exemplary embodiment, the central processing unit 110 processes all events happened before the overhead period finishes. The later events (happened after the overhead period) are delayed till the central processing unit 110 receives the next interrupt request IRQ. As a result, the working period will not be extended indefinitely. Central processing unit 110 is not overly occupied by data storage device 104.

In an exemplary embodiment, the non-volatile memory express interface NVMe uses a completion queue. The pending events may be queued in the completion queue. After the central processing unit 110 completes the overhead period, the driver 112 may indicate the NVMe module of the controller 108 to mark the events already queued in the completion queue to be recognized from the later events (not intended to be processed in this turn). In an exemplary embodiment, the NVMe module marks the queued events to relate to the interrupt request IRQ that is being processed by the central processing unit 110. When the central processing unit 110 enters the working period, the driver 112 accesses the completion queue of the data storage device 104 and recognizes the marked events. The marked events are guaranteed to be completed in this round of working period.

After this round of working period, the NVMe module is not permitted to issue the next interrupt request IRQ until the interrupt delay "d" is satisfied. According to the delayed new interrupt request IRQ, the central processing unit 110 processes the remaining events in the completion queue.

Figure 2:
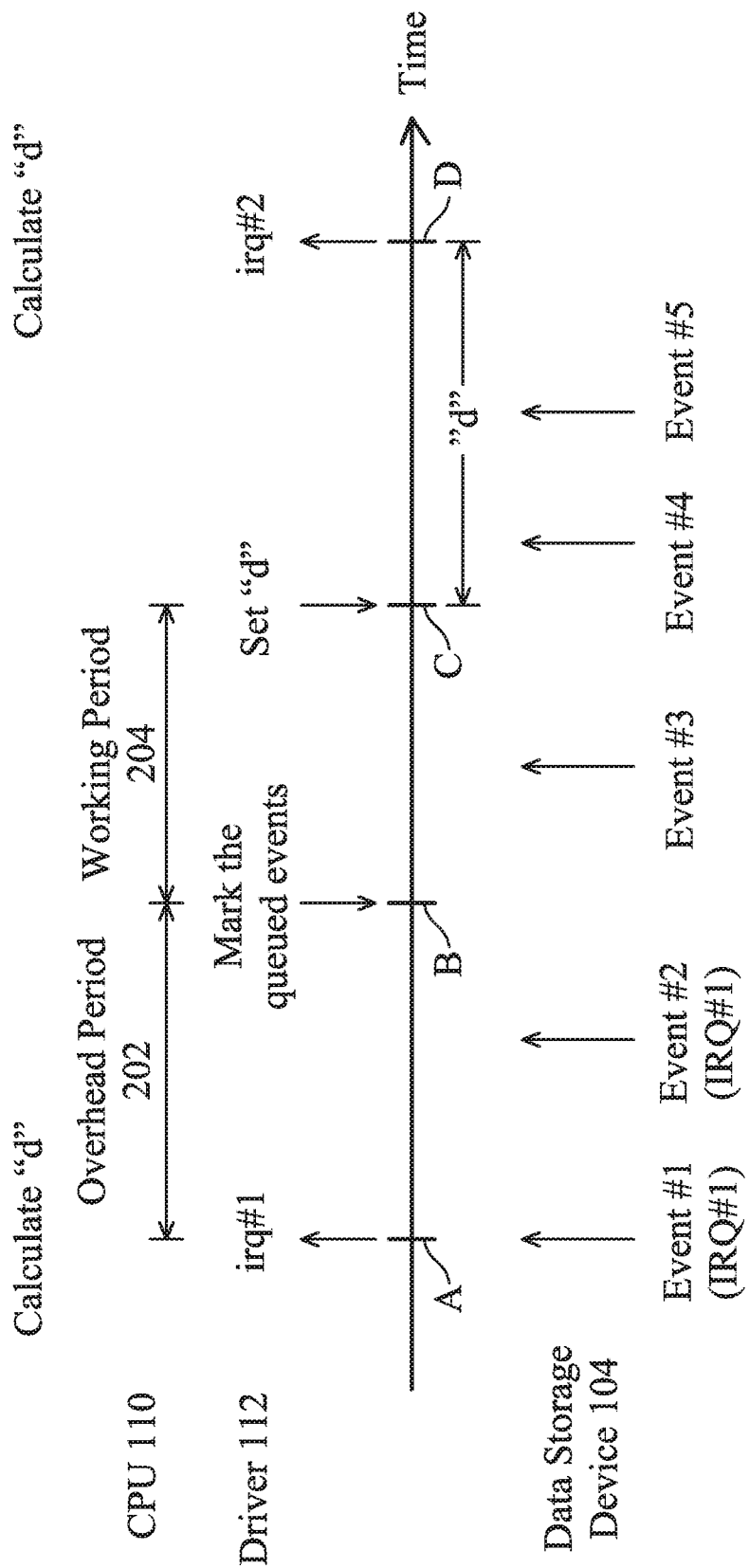
FIG. 2 is a timing diagram illustrating how the driver 112 drives the data storage device 104.

FIG. 2 is a timing diagram illustrating how the driver 112 drives the data storage device 104.

At time point A, event #1 occurs, data storage device 104 issues an interrupt request IRQ #1, and the central processing unit 110 proceeds to an overhead period 202. In particular, the driver 112 calculates an interrupt delay "d" according to whether the central processing unit 110 is waken up from an idle loop or is interrupted from performing other tasks. The calculated interrupt delay "d" will be inserted after this round of interruption processing. During the overhead period 202, event #2 happens. The overhead period 202 ends at time point B. Driver 112 requests to mark the queued events. The data storage device 104 marks the queued events #1 and #2 to associate to the interrupt request IRQ #1. The central processing unit 110 starts the working period 204 and deals with the event #1 and event #2 related to interrupt request IRQ #1. Event #3 occurs during the working period 204, and the central processing unit 110 may process it if having spare capacity, and is not limited to process it within the working period 204. At time point C, the working period 204 ends. The driver 112 passes the previously calculated value of the interrupt delay "d" to the data storage device 104 and, accordingly, the controller 108 stores the calculated value of the interrupt delay "d" in the buffer 114. According to the interrupt delay "d" stored in the buffer 114, the data storage device 104 is not permitted to issue the next interrupt request until the time point D. Event #4 and event #5, which occur between time points C and D, are queued after event #3, waiting for the interrupt delay "d" to end. At time point D, the data storage device 104 issues an interrupt request IRQ #2 for event #3, event #4, and event #5 waiting in the queue. The driver 112 recalculates the interrupt delay "d" according to whether the central processing unit 110 is evoked from the idle loop or is interrupted from performing other tasks. The recalculated interrupt delay "d" will be inserted after this new round of interruption processing (i.e., after the overhead period and working period corresponding to the interrupt request IRQ #2).

As shown, the present invention provides an adaptive interrupt delay "d" that is adjusted according to the status of the central processing unit 110. During the interrupt delay "d", the central processing unit 110 is not interrupted to cope with any tasks requested by the data storage device 104.

In conventional techniques, the communication between the host and the data storage device is switched between an interrupt mode and a polling mode based on the historical evaluation and prediction. The present invention, however, takes the actual status of the central processing unit 110 into consideration rather than making historical evaluation and prediction. Furthermore, the present invention eliminates the complexity and uncertainty of mode switching.

Multiple events are accumulated to be dealt with during the working period 204. As shown, the central processing unit 110 is prevented from redundantly repeating the overhead period. The performance of the central processing unit 110 is greatly enhanced. Specifically, the number of accumulated events is limited. The central processing unit 110 is not infinitely occupied by the data storage device 104.

Figure 3:
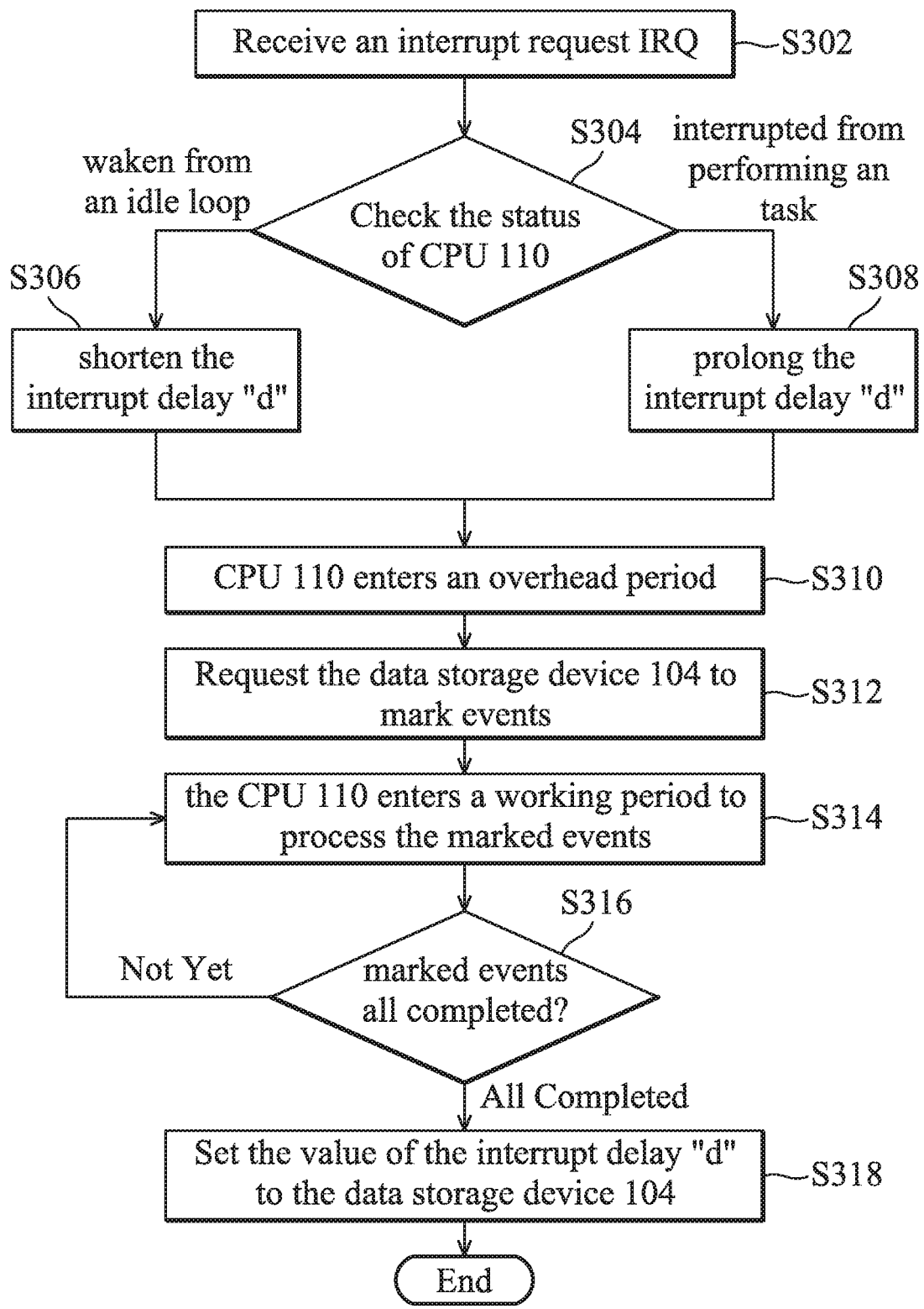
FIG. 3 is a flowchart illustrating how the host 102 copes with the interrupt requests IRQs sent by the data storage device 104 in accordance with an exemplary embodiment of the present invention.

FIG. 3 is a flowchart illustrating how the host 102 copes with the interrupt requests IRQs sent by the data storage device 104 in accordance with an exemplary embodiment of the present invention.

In step S302, an interrupt request IRQ is received. In step S304, the status of the central processing unit 110 is checked. When the central processing unit 110 is in the idle loop, the flow proceeds to step S306 to shorten the interrupt delay "d". When the central processing unit 110 is originally processing other tasks, the flow proceeds to step S308 to prolong the interrupt delay "d". In step S310, the central processing unit 110 enters an overhead period. At the end of the overhead period, step S312 is performed. A request is issued to the data storage device 104 to mark the events must be completed during this round of interruption processing. In step S314, the central processing unit 110 enters a working period to process the marked events. In step S316, when it is determined that the marked events are completed, the working period is ended. In step S318, the value of the interrupt delay "d" is set to the data storage device 104 and this round of interruption processing ends. The next interrupt request is not permitted until the interrupt delay "d" passes. Before the next interrupt request IRQ, the central processing unit 110 may resume the interrupted task or process other tasks.

Figure 4:
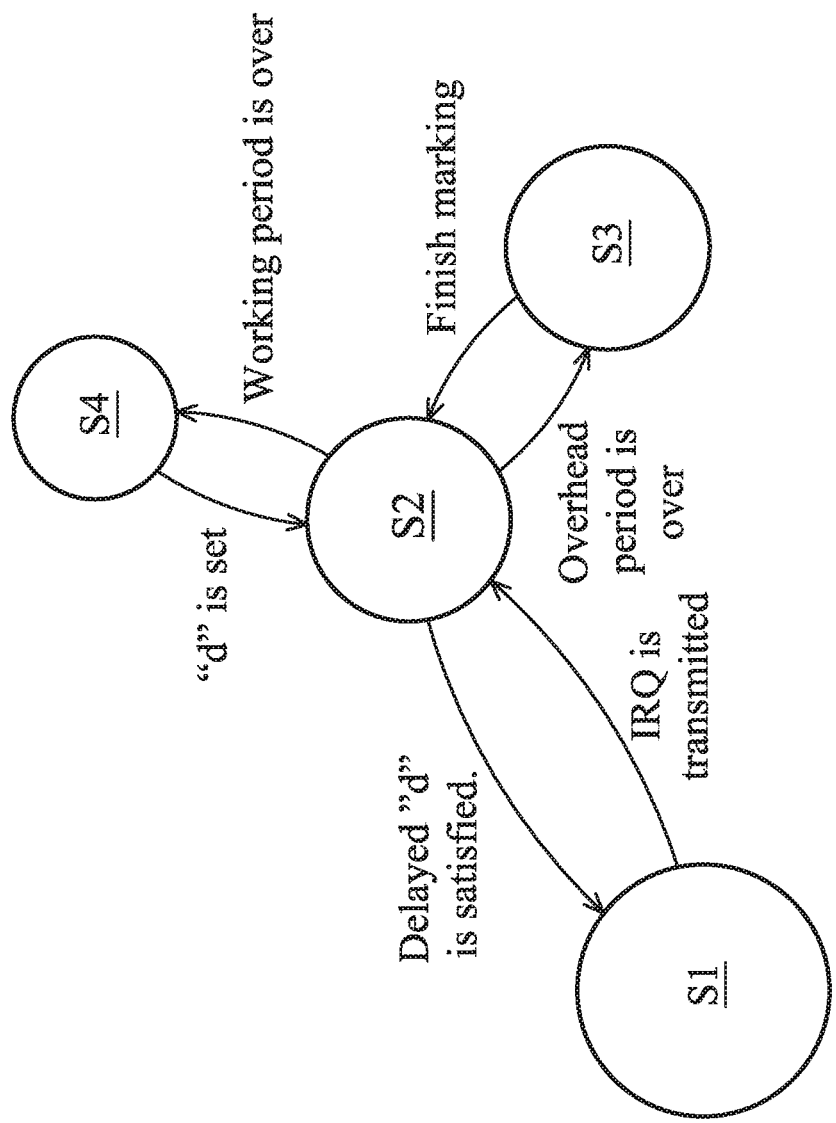
FIG. 4 illustrates a state diagram, depicting how the data storage device 104 issues interrupt requests IRQs to the host 102.

FIG. 4 illustrates a state diagram, depicting how the data storage device 104 issues interrupt requests IRQs to the host 102.

In state S1, the transmission of interrupt request IRQ is allowed. After the transmission of an interrupt request IRQ, the data storage device 104 enters state S2, not permitting the transmission of another interrupt request IRQ. The events occurred as the data storage device 104 is in state S2 are queued waiting for processing. When the central processing unit 110 completes the overhead period, the data storage device 104 enters state S3, marking that the queued events belong to this round of interruption processing. Then the data storage device 104 returns to state S2, the subsequent events are queued without marking and should be processed in the next interruption processing. Although the data storage device 104 in the state S2 is not permitted to issue the next interrupt request IRQ, the host 102 still works for the data storage device 104 to respond to the marked events in the queue one by one. When the central processing unit 110 finishes the working period, the data storage device 104 enters state S4 to receive the interrupt delay "d" setting from the host 102. During the interrupt delay "d", the data storage device 104 is maintained in the state S2, and more events are queued for processing. Note that no interrupt request IRQ is issued until the interrupt delay "d" passes. After the interrupt delay "d", the data storage device 104 enters state S1. Transmission of interrupt request IRQ is allowed. An interrupt request IRQ is sent out when there are any events in the queue. In another example, when the queue is empty, the data storage device 104 waits for an event to occur in state S1, and then issues an interrupt request IRQ. The above state switching may be implemented by the NVMe module/chip of the controller 108.

In particular, the present invention may be used not only for data storage peripherals using NVMe links, but also for network peripheral accessing.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory; and
a controller, operating the non-volatile memory in response to a host,
wherein:
the controller has a buffer which stores an interrupt delay that is evaluated by the host according to a status of a central processing unit of the host;
the controller delays sending an interrupt request to the host according to the interrupt delay;
when the controller sends a first interrupt request to the host, a driver of the host checks whether the central processing unit is awakened from an idle loop or is interrupted from performing a task, and thereby adjusts the interrupt delay to delay a second interrupt request; and
after the central processing unit completes an overhead period and a working period corresponding to the first interrupt request, the controller is not permitted to issue the second interrupt request until the interrupt delay is satisfied.

2. The data storage device as claimed in claim 1, wherein:
when the central processing unit wakes from an idle loop, the interrupt delay is shortened by a first adjustment amount; and
when the central processing unit is interrupted from performing a task, the interrupt delay is increased by a second adjustment amount.

3. The data storage device as claimed in claim 2, wherein the first adjustment amount is greater than the second adjustment amount.

4. The data storage device as claimed in claim 2, wherein the interrupt delay has an upper limit.

5. The data storage device as claimed in claim 1, wherein:
when the overhead period is completed, the driver prompts the controller to mark events queued in a queue;
the central processing unit completes the marked events during the working period; and
when the interrupt delay has been satisfied and there are any unmarked events in the queue, the controller sends the second interrupt request.

6. The data storage device as claimed in claim 1, wherein:
when the working period is completed, the driver provides the interrupt delay to be filled into the buffer of the controller, and the controller determines a transmission time point of the second interrupt request according to the interrupt delay.

7. A data storage system, comprising:
a host; and
a data storage device comprising a non-volatile memory and a controller,
wherein:
the controller operates the non-volatile memory in response to the host,
the host has a central processing unit and runs a driver;
according to a status of the central processing unit, the driver issues an interrupt delay to the data storage device;
the controller delays sending an interrupt request to the host according to the interrupt delay;
when the controller sends a first interrupt request to the host, the driver of the host checks whether the central processing unit is awakened from an idle loop or is interrupted from performing a task, and thereby adjusts the interrupt delay to delay a second interrupt request; and
after the central processing unit completes an overhead period and a working period corresponding to the first interrupt request, the controller is not permitted to issue the second interrupt request until the interrupt delay is satisfied.

8. The data storage system as claimed in claim 7, wherein:
when the central processing unit wakes from an idle loop, the interrupt delay is shortened by a first adjustment amount; and
when the central processing unit is interrupted from performing a task, the interrupt delay is increased by a second adjustment amount.

9. The data storage system as claimed in claim 8, wherein the first adjustment amount is greater than the second adjustment amount.

10. The data storage system as claimed in claim 8, wherein the interrupt delay has an upper limit.

11. The data storage system as claimed in claim 7, wherein:
when the overhead period is completed, the driver prompts the controller to mark events queued in a queue;
the central processing unit completes the marked events during the working period; and
when the interrupt delay has been satisfied and there are any unmarked events in the queue, the controller sends the second interrupt request.

12. The data storage system as claimed in claim 7, wherein:
the controller has a buffer to be filled with the interrupt delay; and
when the working period is completed, the driver provides the interrupt delay to be filled into the buffer, and the controller determines a transmission time point of the second interrupt request according to the interrupt delay.

* * * * *